Figure 1:
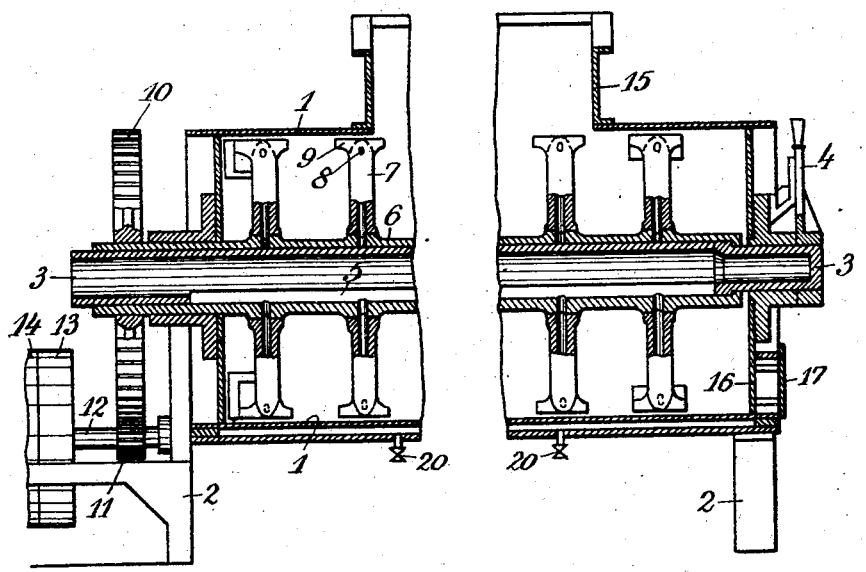

Jan. 11, 1927.

N. C. NIELSEN

DRYING APPARATUS

Filed July 28, 1925

1,614,253

INVENTOR:
Niels Christian Nielsen
BY: Ruege, Boyne & Bakelar
ATTORNEYS.

Patented Jan. 11, 1927.

1,614,253

UNITED STATES PATENT OFFICE.

NIELS CHRISTIAN NIELSEN, OF EBELTOFT, DENMARK.

DRYING APPARATUS.

Application filed July 28, 1925, Serial No. 46,544, and in Denmark August 9, 1924.

The invention relates to a drying apparatus for drying various substances, with a hollow cylinder heated from the outside and rotary stirring arms disposed within the said cylinder which arms are hollow and open at both ends and supported by a hollow outer rotary shaft encircling an inner hollow, normally non-rotary shaft provided at its underside with a longitudinal slot and supplying dry hot air which is blown out through the slot and the arms gradually as the latter come opposite the longitudinal slot during the rotation of the outer shaft. The distinguishing feature of the invention is that the inner hollow shaft is adjustable about its longitudinal axis, in such a manner that the position of its longitudinal slot, relatively to the vertical plane at the axial center of the apparatus, may be varied.

Figure 2:
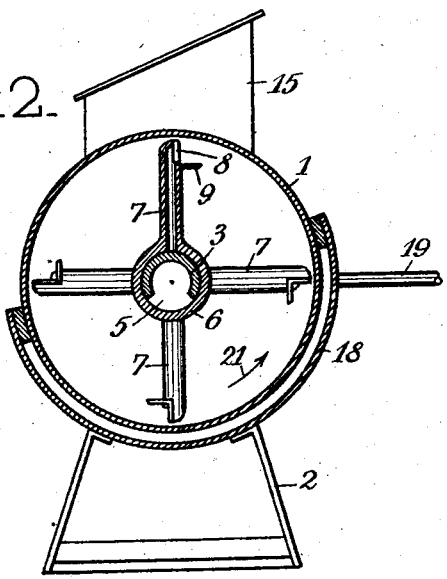

On the drawing,

Figs. 1 and 2, respectively, show a vertical longitudinal section and a cross-section of the apparatus.

1 is a hollow horizontal cylinder, which is supported in a suitable frame 2, and which is fitted with a hollow shaft 3 closed at one end but open at the opposite end, which latter communicates with a blower not shown on the drawing. The shaft 3 is normally stationary, but is adapted to be rotated slightly about its axis by means of a handle 4, Fig. 1, which is attached to the shaft 3. In the bottom side of the latter there is provided a longitudinal slot 5. Encircling the shaft 3 there is provided another tubular shaft 6 which is fittted with a number of radial tubular arms 7 open towards the shaft 3 as well as at their free end. The opening 8 provided at the latter end faces away from the direction of rotation of the arm, and at the same end there may be provided a vane 9 bent at right angle. At the end of the shaft 6 outside the cylinder 1 there is attached a gear 10 engaging a pinion 11 on a shaft 12 which is journalled in the frame 2, and supports pulleys 13 and 14 for a belt which is not shown on the drawing.

15 is a supply opening provided in the cylinder 1, either at top or at one end of the cylinder, depending on the operation being either non-continuous or continuous. 16 is a discharge opening closed by means of a door 17, Fig. 1. About the lower portion of the cylinder 1 there is provided a heating jacket 18 with a supply pipe 19, Fig. 2, and discharge pipes 20, Fig. 1, for the heating medium. The heating jacket 18 extends slightly further up on the wall of the cylinder 1 on the side towards which the stirring arms 7 are rotated than on the opposite side, as owing to the rotation of the stirring arms the material will stand somewhat higher on this side than on the opposite one.

When the drying operation is to commence, the cylinder 1 is filled to a certain level with the material to be dried, the said level depending on the kind and nature of the material, and whether the apparatus is to be operated continuously or intermittently. Then a heating medium is directed through the heating jacket 18, while simultaneously hot air is blown through the pipe 3, and the shaft 6 with the stirring arms 7 is set into rotation in the direction indicated by the arrow 21 in Fig. 2. The hot air will then flow out by way of the slot 5 and the stirring arms 7, gradually as the latter, by the rotation, come opposite the slot 5. The hot air will therefore only escape into the material in the lower portion of the cylinder. Depending on the nature and consistency of the material and the height of the surface thereof in the cylinder, the hollow shaft 3 may be turned slightly about its own axis so that the slot 5 may be disposed at such an angle relatively to the vertical plane at the axial center of the apparatus that the air will not pass out through the stirring arms until the latter have entered the material, and so that air will continue to be blown out through the arms, until they reach entirely up to the surface of the material on the side where they leave it again.

Having thus described my invention, what I claim is:—

Drying apparatus for drying various substances, comprising a hollow cylinder provided with an exterior heating jacket, rotary stirring arms within said cylinder, said arms being hollow and open at both ends and supported by a hollow rotary shaft, the said shaft encircling an inner hollow normally stationary shaft in the wall of which there is provided, at bottom thereof, a longitudinal slot by way of which the hollow stirring arms, during the rotation of the outer shaft, may communicate with the interior of the inner shaft, said inner shaft being adapted to communicate with a feeder device for dry hot air, the inner shaft being adapted to be turned about its longitudinal axis thereby to alter the position of the longitudinal slot relatively to the vertical plane through the longitudinal axis of the apparatus.

In testimony whereof I have signed my name to this specification.

NIELS CHRISTIAN NIELSEN.